(12) United States Patent
Lopez (10) Patent No.: US 7,822,385 B2
(45) Date of Patent: Oct. 26, 2010

(54) ADJACENT CHANNEL INTERFERENCE SUPRESSION

(75) Inventor: Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 11/710,617

(22) Filed: Feb. 26, 2007

(65) Prior Publication Data

US 2007/0254590 A1 Nov. 1, 2007

Related U.S. Application Data

(60) Provisional application No. 60/795,180, filed on Apr. 27, 2006, provisional application No. 60/796,895, filed on May 3, 2006.

(51) Int. Cl.
*H04B 1/00* (2006.01)
(52) U.S. Cl. .................. 455/63.1; 455/254; 455/266; 455/296; 455/302; 455/306
(58) Field of Classification Search ............... 455/254, 455/266, 296, 302, 306
See application file for complete search history.

(56) References Cited

U.S. PATENT DOCUMENTS

| 3,503,069 | A | | 3/1970 | Lloyd | |
|---|---|---|---|---|---|
| 5,493,717 | A | * | 2/1996 | Schwarz | 455/306 |
| 5,564,093 | A | * | 10/1996 | Matsumoto | 455/266 |
| 6,047,171 | A | * | 4/2000 | Khayrallah et al. | 455/266 |
| 6,352,562 | B1 | * | 3/2002 | Willey et al. | 8/111 |
| 6,834,043 | B1 | * | 12/2004 | Vook et al. | 370/310 |
| 6,901,243 | B2 | * | 5/2005 | Jayaraman et al. | 455/63.1 |
| 6,952,562 | B1 | | 10/2005 | Hantke et al. | |
| 7,421,261 | B2 | * | 9/2008 | Sahlin et al. | 455/135 |
| 2003/0087622 | A1 | | 5/2003 | Jayaraman et al. | |
| 2003/0171123 | A1 | * | 9/2003 | Laakso et al. | 455/453 |
| 2004/0252631 | A1 | * | 12/2004 | Park | 370/210 |

FOREIGN PATENT DOCUMENTS

WO   WO 2007/126369   8/2007

OTHER PUBLICATIONS

International Search Report and Written Opinion mailed Nov. 6, 2007 in corresponding PCT/SE2007/050168.
Rao, A, "Adaptive Algorithms for Spatial Adaptive Interference Rejection" Personal Wireless Communications, 2202 IEEE International Conference , Dec. 15-17, 2002, pp. 326-329.

* cited by examiner

*Primary Examiner*—Edward Urban
*Assistant Examiner*—Ganiyu Hanidu
(74) *Attorney, Agent, or Firm*—Nixon & Vanderhye P.C.

(57) ABSTRACT

Adjacent channel interference (ACI) suppression is achieved by selectively applying one or more pre-calculated fixed filters only when necessary, thereby preserving the sensitivity of the receiver. An energy detector accurately detects adjacent channel interference in the frequency band of the desired signal so that the likelihood of a false detection of ACI is very low. If the energy detector detects adjacent channel interference is present in the band of the desired signal, then the received signal is selected to be filtered by the pre-calculated filter, e.g., a low pass filter. Otherwise, the pre-calculated filter is bypassed. In either case, additional ACI suppression processing may be employed.

27 Claims, 8 Drawing Sheets

ADJACENT CHANNEL INTERFERENCE SUPRESSION

PRIORITY APPLICATIONS

Priority is claimed from U.S. provisional application Ser. No. 60/795,180, filed on Apr. 27, 2006, and from U.S. provisional application Ser. No. 60/796,895, filed on May 3, 2006, the disclosures of which are specifically incorporated herein by reference.

TECHNICAL FIELD

The technical field relates to radio communications, and in particular, to improving the suppression of adjacent channel interference (ACI).

BACKGROUND

Figure 1:
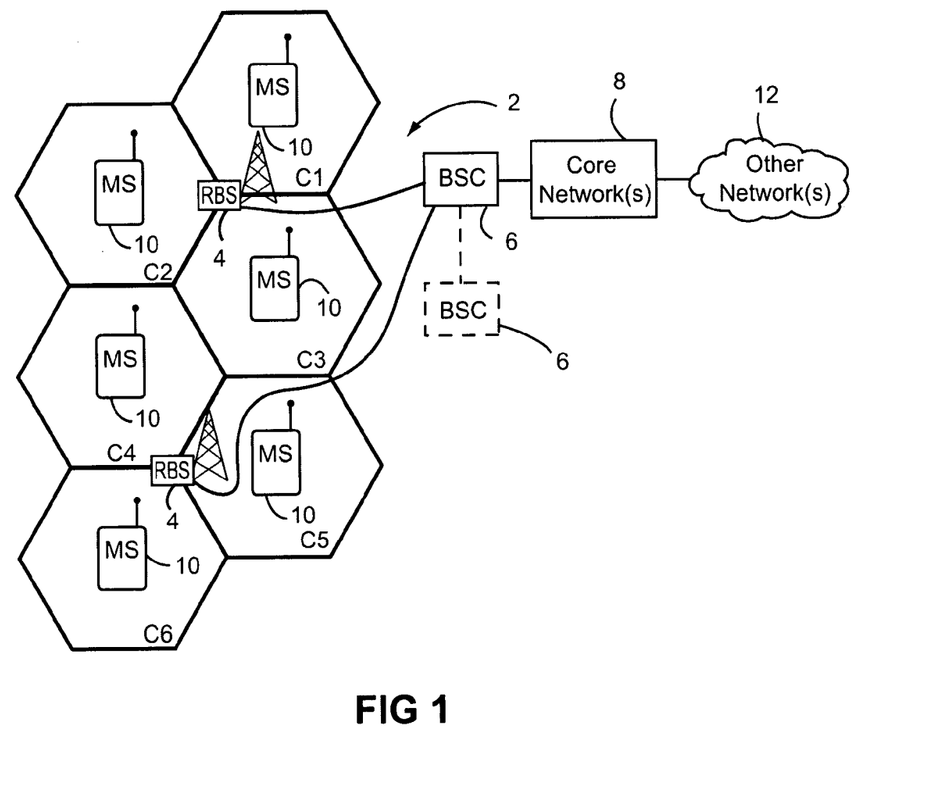
FIG. 1 is a diagram of a cellular radio communications system.

FIG. 1 illustrates an example cellular wireless communications system 2. A plurality of mobile stations (MSs) 10 (sometimes called mobile terminals, user equipments, etc.) are located in a geographical service area covered by cells C1 through C6. Radio base stations (RBSs) 4 are positioned within the geographic area covered by the cells C1 through C6 and act as an interface between the mobile station 10 and the wireless communications system 2. The radio base stations 4 are typically connected to a base station controller (BSC) 6 or radio network controller (RNC), which in turn is connected to one or more core network nodes like a mobile switching center (MSC), a serving GSM support node (SGSN), etc. The BSC 6 may be connected to other BSCs, and the core network node(s) are usually coupled to external networks like a public switched telephone network (PSTN) 8 and/or the Internet.

The wireless communications system 2 in FIG. 1 has only a limited frequency band it is allowed to use. Each cell is assigned a set of channels in the allowed frequency band. Each set of channels is reused after separation of a certain number of cells so that adjacent cells are assigned a different set of channels to reduce/alleviate co-channel interference. Thus, for wireless communications systems that divide the spectrum into narrow frequency bands, such as GSM, careful frequency planning is usually required.

Figure 2:
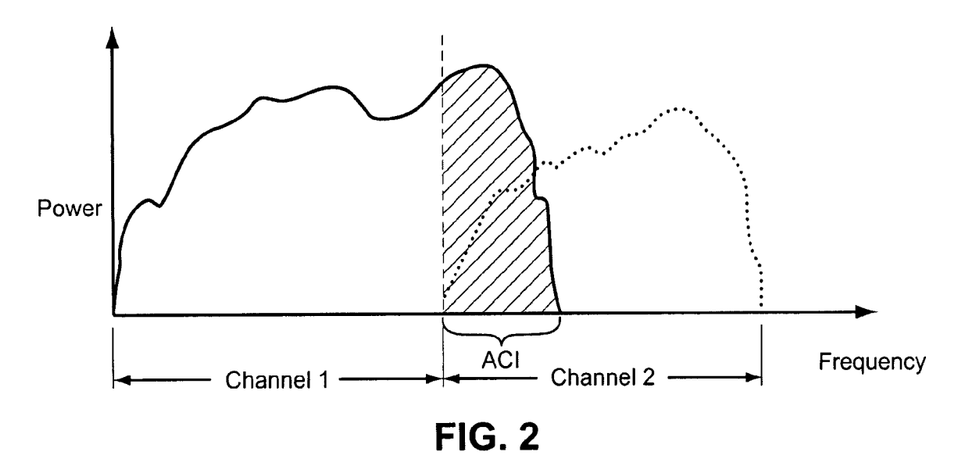
FIG. 2 is a graph illustrating adjacent channel interference (ACI)

Despite the best efforts of network planners, some degree of adjacent channel interference (ACI) is unavoidable. The energy of two signals on adjacent carrier frequencies will often result in undesired interference because the bandwidth of the spectrum of the signals is larger than the separation between the carriers. An example of adjacent channel interference is shown in the graph of FIG. 2. The upper frequency portion of channel 1 spills over into the lower frequency portion of channel 2 interfering with the desired signals on channel 1. A consequence of such adjacent interference is loss of spectral efficiency. Users may experience dropped calls, lower data rates, or other disruptions, and operators may experience revenue loss due to loss of capacity and lower customer satisfaction.

One way to suppress ACI is with preset bandpass or lowpass filters (analog or digital). Although such preset filters generally work well to suppress ACI when it is present, the price for using them is a substantial loss in receiver sensitivity. In other words, the filters remove some of the desired signal as well as the ACI. More specifically, such filters "clip" the desired signal energy so that the ability to suppress adjacent interference is increased, but at the price of a decreased capability to detect and decode weak signals in the presence of thermal noise. Because it operates regardless of ACI, a preset ACI filters/attenuates some of the frequency spectrum of the desired signal even when no ACI is present. Another problem is that co-channel interference suppression is diminished with narrow bandpass/lowpass filtering.

As systems have evolved, e.g., EDGE was introduced to GSM, new modulation techniques have been employed. For the EDGE example, 8PSK modulation was introduced. The 8PSK modulation required wider filters then the previous modulation used because 8PSK-modulated signals are very sensitive to Inter-Symbol-Interference (ISI). Narrow bandpass or lowpass filters increase ISI. The wider filters used in EDGE also improve receiver sensitivity but at the cost of less effective adjacent interference suppression.

A response to this dilemma is to use an adaptive ACI suppression algorithm that analyzes the received signal, searches for interference of any sort, and if some interference is found, then attempts to suppress it. One type of adaptive ACI suppression algorithm is based on statistical models where the estimated interference is "fit" into a given mathematical model or family of models. Adaptive ACI suppression algorithms are based on an analysis of training symbols and possibly payload data in order to produce estimates of the spectrum or autocorrelation of the interference. These interference estimates are then used to design adaptive ACI suppression filters typically implemented in software. An advantage of this approach is that if no adjacent channel interference is present, then no ACI filtering is done. Consequently, the sensitivity of the receiver is not degraded.

A problem with the adaptive ACI suppression approach is that such software-based interference suppression filters are typically suboptimal. First, the number of samples available to perform the estimates is often very small. Second, the radio environment is extremely hostile, leading to great variations in the desired signal and the interference, even during the duration of a single transmission burst. Third, for reasons of computational load, the interference must be approximated using relatively simple models, even though its spectrum can be quite complicated, e.g., when there are several simultaneous interferers. All three result in relatively inaccurate interference estimates, and hence, suboptimal interference suppression filters. Other adaptive algorithms require the filtering of the incoming signal and making some comparison between estimates of the quality of the original and filtered signals. These algorithms are ad-hoc, are difficult (or in practice impossible) to analyze theoretically, must be tuned based solely on simulations, and often do not have good performance.

It is an object to provide technology that improves the suppression of adjacent channel interference (ACI) in light of the problems noted above.

SUMMARY

The technology described here effectively achieves the advantages of the narrow bandpass/lowpass filtering approach as well as the adaptive ACI suppression algorithm approach but avoids their pitfalls. One or more pre-determined narrow bandpass/lowpass filters are provided to suppress adjacent channel interference, but they are selectively used only when necessary, thereby preserving the sensitivity of the receiver. If an energy detector detects adjacent channel interference in the band of the desired signal, then the received signal is selected to be filtered by a predetermined bandpass or lowpass filter. Otherwise, that filter is bypassed.

In either case, additional optional ACI suppression processing may be employed, non-limiting examples of which are described below.

A receiver includes one or more filters designed to suppress interference in a desired frequency band associated with the receiver. An energy detector determines with a high probability of certainty whether adjacent channel interference is present in the desired frequency band. The received signal is filtered in the one or more filters if adjacent channel interference is likely present in the desired frequency band. But filtering of the received signal in the one or more filters is bypassed if the energy detector determines that adjacent channel interference is likely not present in the desired frequency band. Additional adjacent channel interference suppression may be performed on the filtered or the filter-bypassed signal. For example, adaptive filtering, blind detection of a modulation associated with the received signal, equalization, or demodulation of the received signal can be used.

In one non-limiting example implementation of the energy detector, a first energy of the received signal associated with desired frequency band, a second energy of the received signal associated with a portion of the desired frequency band, and a ratio of the first and second energies are determined. When the ratio exceeds a threshold, a determination is made that there is a high probability of certainty of adjacent channel interference in the desired frequency band. The threshold may be determined based on a probability detection function and a desired probability or a likelihood of certainty.

In another non-limiting example implementation, the received signal x is an M-dimensional signal, where M is an integer greater than two. A Fourier transform of each dimension of the received signal is calculated to generate a multi-dimensional signal X in the frequency domain. An M×M sample covariance matrix C of the Fourier transformed signal X is calculated, and a matrix W whose columns are M normal eigenvectors of the M×M sample covariance matrix C are determined. M linear combinations are calculated from X and W for each dimension. One of the linear combinations having the highest energy ratio is selected that reflects the ACI, thereby reducing the multi-dimensional signal into a one dimensional signal. The selected ratio is used in the ACI threshold comparison.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The technology described here has ready application to any receiver and is not limited to a base station or mobile station. Nor is the technology limited to a particular radio transmission technique; indeed, it has application to any receiver in which ACI suppression is useful.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 3:
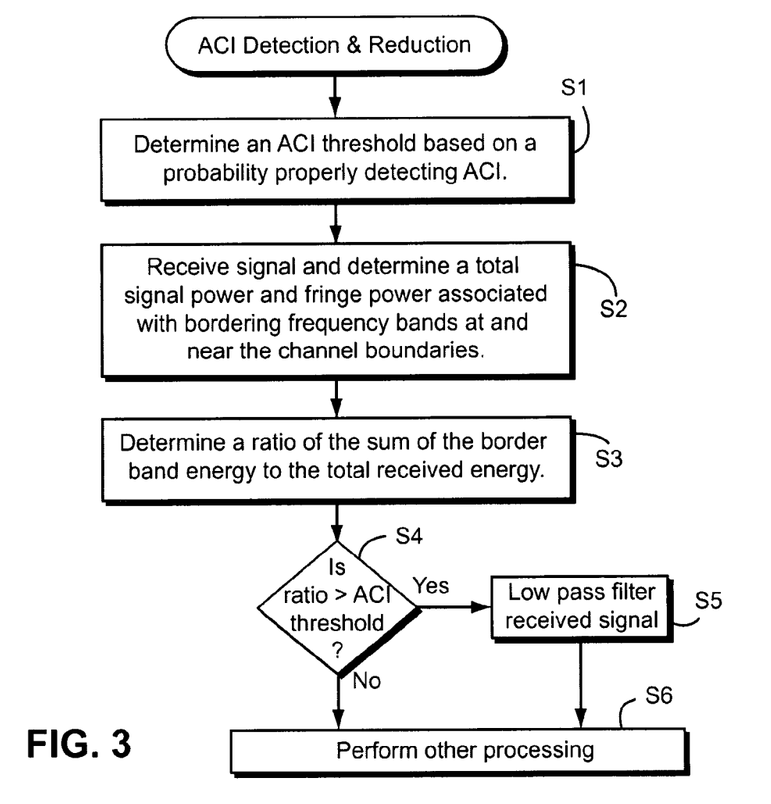
FIG. 3 is a flowchart illustrating non-limiting example procedures for ACI detection and selective suppression.

FIG. 3 is a flow chart illustrating non-limiting example procedures for adjacent channel interference (ACI) detection and selective ACI suppression. In step S1, an ACI threshold is determined. For example, an ACI threshold may be determined based on a probability of properly detecting adjacent channel interference. When a signal is received, a total signal power across the desired frequency band as well as just in fringe or outer portions of the frequency at or near the channel frequency boundaries ("border band energy") are determined (step S2). A ratio of the sum of the border band energy relative to the total received energy in the desired frequency band is determined (step S3). A decision is made in step S4 whether that ratio exceeds the predetermined ACI threshold. If so, the received signal is filtered in a low pass ACI suppression filter (step S5). If the ratio does not exceed the ACI threshold, the low pass filtering step is bypassed, and the received signal is provided for other processing (step S6). The low pass-filtered signal is also passed on for further processing in step S6.

Figure 4:
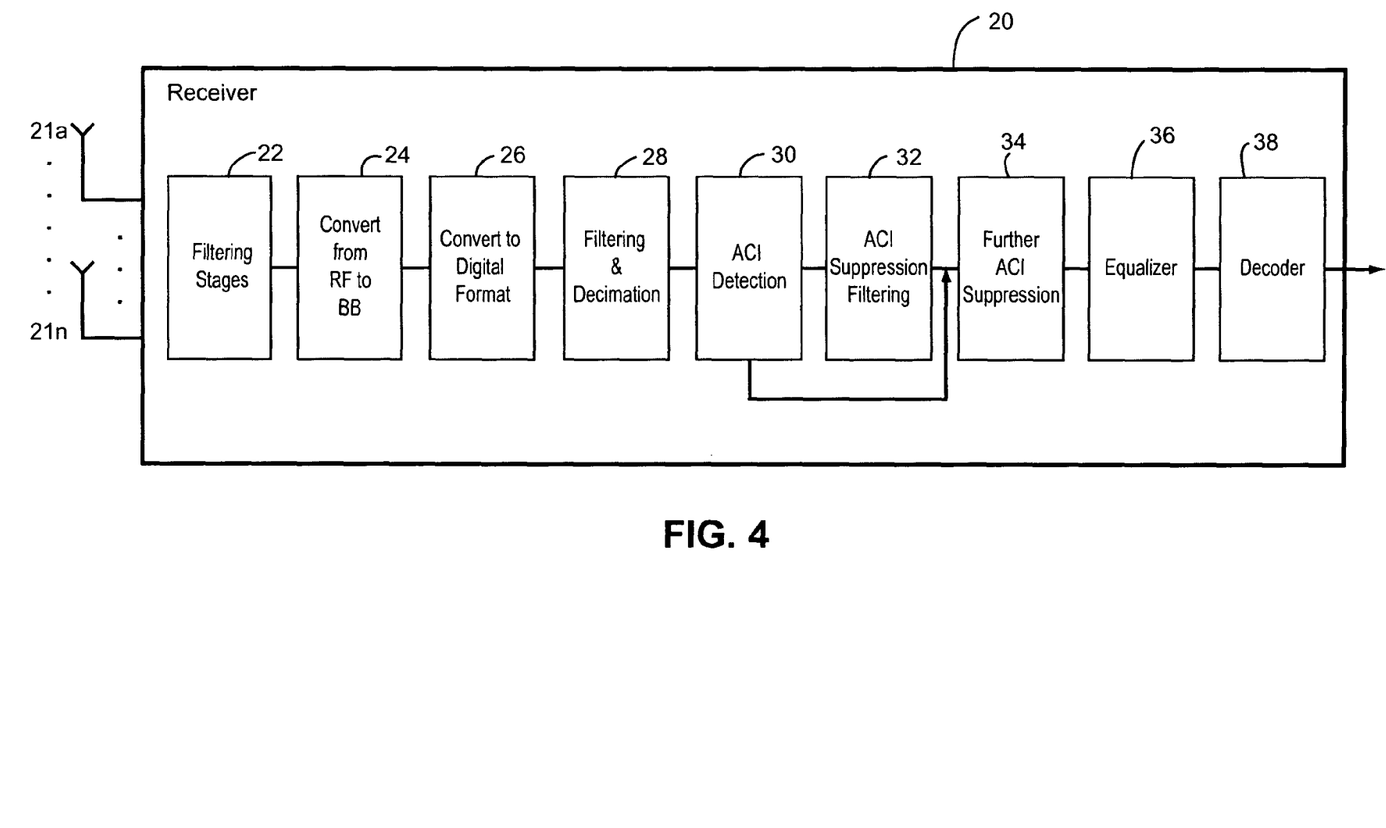
FIG. 4 is a function block diagram of a non-limiting example receiver incorporating ACI detection and selective ACI suppression.

FIG. 4 is a function block diagram of a non-limiting example receiver that employs adjacent channel interference detection and selective adjacent channel interference suppression. The receiver 20 includes one or more antennas 21A . . . 21N. The received signal(s) is(are) filtered in one or more filtering stages 22. The filtered signal is converted from radio frequency to base band in block 24. The base band signal is then converted to digital format in block 26, typically at a relatively high sampling rate. If that is the case, the samples may be filtered and decimated in block 28 to a lower sampling rate for processing.

The sample signals are then processed in the ACI detection block 30, which can be viewed as an ACI energy or power detector. The ACI detection block 30 may, for example, perform the procedures outlined in the flow chart of FIG. 3. If the border band-to-total received energy in the desired frequency band exceeds an ACI threshold, then the ACI detection block 30 passes the received signal samples onto the ACI suppression filtering block 32, which in a preferred non-limiting example embodiment, includes one or more low pass filters specifically designed to remove adjacent channel interference in the desired band. The output of the ACI suppression filtering block 32 may be optionally further processed in the further ACI suppression block 34. For example, this block may implement adaptive ACI suppression filtering algorithms which suppress any remaining ACI. This can be useful in instances when a non-negligible fraction of the energy of the ACI leaks into the neighborhood of the center of frequency of the desired signal. This type of ACI cannot be suppressed with the lowpass filter block 32. Moreover, it is not desirable to use very narrow filters in block 32 since this can have negative effects, such as increased intersymbol interference. If the ACI detection block 30 detects that the border band-to-total received energy ratio is less than the ACI threshold, it sends the received signal samples on a bypass route around the ACI suppression filtering block 32 into the further ACI suppression block 34. The output from the further ACI suppression block 34 band is preferably further processed, such as equalization in the equalizer block 36 and decoding in the decoder block 38, before being passed on for higher level processing.

A mathematical basis for the ACI energy detector 30 is now provided. The ACI energy detector 30 is non-parametric, and being based on energy estimates, it works whether the interference is synchronized or unsynchronized. In synchronized networks, all users in the network send or receive signals simultaneously. In unsynchronized networks, users in different cells may send or receive at different times. Thus, if the network is unsynchronized, the adjacent interference can overlap the desired signal only over the data part of the burst but not over the training sequence part of the burst. Let $x=\{X_0, \ldots, X_N\}$ denote the received signal. The following hypotheses are defined:

$H_0$: x is white noise $H_1$: x is white noise plus adjacent interference (1)

The objective is to properly select between them. To do this, a statistic $L(x)$ and a threshold $\gamma$ (selected by a designer depending on a tolerable probability of wrongly detecting ACI) are defined such that $H_1$ is chosen whenever:

$$L(x) > \gamma \quad (2)$$

The threshold $\gamma$ may be selected by a designer depending on a tolerable probability of wrongly detecting ACI.

An additional condition is imposed on $L(x)$. If H is a statistical hypothesis regarding x, then the probability density function of x under H is denoted by $p(x;H)$. We define:

$H'_0$: x as white noise plus the desired signal (3)

We also require that:

$$\int_{\{x:L(x)>\gamma\}} p(x; H_0) dx \geq \int_{\{x:L(x)>\gamma\}} p(x; H'_0) dx \quad (4)$$

The right hand side of equation (4) is the probability of a false alarm (i.e., wrongly detecting ACI rather than noise) for the ACI detection equation (2). Thus, the ACI detection equation (2) may also be used to distinguish between the hypotheses $H'_0$ and $H_1$.

The price of this indirect approach is suboptimal detection performance. By assuming in equation (1) that the desired signal is white noise, some a-priori information is disregarded, which means that the energy detector may not make the best possible decisions. For example, the typical pulse shaping filter used in the transmitter and usually known at the receiver, gives a low pass characteristic to the spectrum of the desired signal. The example energy detector described below ignores this information in order to ease the mathematical analysis and reduce computational complexity (the spectral characteristics of white noise are particularly simple). Consequently, the detector is designed under the assumption of equation (1), which makes the problem tractable from a mathematical perspective. The assumptions in equations (3) and (4), which are usually fulfilled in practice in cellular communications systems, ensure that the detector decisions are also applicable to the carrier signal. As a result, the statistic $L(x)$ with the desired properties is better described in the frequency domain.

Assume first that x is one-dimensional, corresponding to a one branch receiver. Let $X(f)$ be the Fourier transform of the received signal x. Next, we choose a constant B such that $0 < B < 1/(2T)$, where T is the symbol rate, to define the border band energy associated with the outer portions of the desired channel that are more likely to be affected by ACI. FIG. 2, for example, shows an upper border of channel 1 that experiences ACI. We then define total band energy E and various border band energies $E_{out}$ (the total outer or border band energy), $E^+_{out}$ (the upper border band energy), and $E^-_{out}$ (the lower border band energy) as follows:

$$E_{out} = \int_{B<|f|<\frac{1}{2T}} |X(f)|^2 df \quad (5)$$

$$E^+_{out} = \int_{B<f<\frac{1}{2T}} |X(f)|^2 df \quad (6)$$

$$E^-_{out} = \int_{\frac{1}{2T}<f<-B} |X(f)|^2 df \quad (7)$$

$$E = \int_{|f|<\frac{1}{2T}} |X(f)|^2 df \quad (8)$$

An ACI energy detector for adjacent channel interference may then be defined as follows:

$$L(x) = \frac{E_{out}}{E} \quad (9)$$

For one-sided interference (either in the upper border band or in the lower border band), the ACI detector is defined by:

$$L(x) = \frac{E^+_{out}}{E} \quad (10)$$

$$L(x) = \frac{E^-_{out}}{E} \quad (11)$$

The total band energy E is proportional to the noise variance under the hypothesis $H_0$. In general, the noise variance may be estimated by the total channel band energy E. Equation (4) holds for a static channel, a one-tap Rayleigh channel, and for more general fading channels.

The ACI energy detector may be applied to multi-dimensional signals where there are two or more receiver branches. Indeed, it is possible to even achieve better performance than for the single dimension/branch case. Let x be an $[(N+1) \times M]$ complex matrix of received signals. Here, M is the number of diversity branches and (N+1) is the number of samples. Let X be a matrix whose columns are the discrete Fourier transforms of the columns of x. The sample covariance matrix C of X is calculated as follows:

$$C = X^* \cdot X \qquad (12)$$

The star * denotes a matrix transpose followed by complex conjugation of all the entries of the matrix. The solution of the eigenvalue problem:

$$C \cdot w = \lambda \cdot w \qquad (13)$$

gives M orthonormal eigenvectors of C. With these, an M×N unitary matrix is formed whose columns are the orthonormal eigenvectors. A new matrix $X^W$ is then formed by combining the columns of X according to the following equation:

$$X^W = X \cdot W \qquad (14)$$

This matrix multiplication is beam-forming in the frequency domain. Beam-forming typically combines the multi-dimensional received signal in order to enhance the desired signal. But in the inventor turned that traditional use of beam-forming around and used it in an unconventional way to enhance the interference should any be present. The out of band energy and total energy defined by equations (5)-(8) can be computed for each of the M columns of $X^W$. Hence, the statistics L(x) defined in equations (9)-(11) can be defined for each the columns of $X^W$.

Thus, if the input matrix x is composed only of white noise, then both X and $X^W$ are white noise. If x consists of the desired signal plus white noise, then in one of the columns of $X^W$ (corresponding to one of the receiver branches), the spectrum of the desired signal is suppressed, leaving only a white noise spectrum. In another column (corresponding to another one of the receiver branches), the spectra of the M signals are coherently combined resulting in even more energy in the center portion of the desired band [−B, B] (relative to the total energy) than any of the original signals. The center portion of the desired band extends towards its borders to symmetrical frequencies −B and B. The border band portions of the desired band extend from −B and B to the lowest and highest frequencies −W and +W, respectively, that define the complete desired band.

Finally, if x contains both a desired signal and adjacent interference, then in one of the columns of $X^W$, the spectrum of the desired signal is suppressed, while the spectrum of the adjacent interference is enhanced, yielding an increase of the amount of energy outside of the band [−B, B] relative to the total energy. It is this column of the matrix $X^W$ that is selected for energy ratio processing and comparison with the ACI threshold. In this way, even though the false alarm probability (i.e., wrongly detecting ACI in the desired band) is not increased, the probability of accurate adjacent interference detection is increased, yielding better ACI detection performance.

Although the ACI energy detector is explained for signals sampled at the symbol rate, the detector also works when the signals are oversampled. Oversampling provides information about the spectrum of the received signal outside of the frequency band of width 1/T centered at the carrier frequency. Such information is not available when the signal has been sampled with period T. Because the objective is to detect and ultimately suppress adjacent interference in the band of the carrier, simply detecting the presence of a signal in an adjacent channel is not equivalent to detecting ACI in the desired band. Trying to suppress such an adjacent signal whose energy has not spread over into the band of interest will reduce performance. Accordingly, before the ACI energy detector is used, an appropriate ACI threshold should be determined. One non-limiting example way to select an ACI threshold is to use a closed-form expression for the probability $P_{FA}$ that ACI is wrongly or falsely detected. Assume that the received signal $x = \{x_0, \ldots, x_N\}$ is complex, zero-mean Gaussian white noise and that E and $E^+_{out}$ are calculated using the (N+1)-point Discrete Fourier Transform (DFT) X of x. Because X is also zero-mean Gaussian white noise, it follows that E is the sum of the amplitude squared of (N+1) independent complex Gaussian variables, while $E^+_{out}$ is the sum of the amplitude squared of M independent complex Gaussian variables. Here, M<N+1 is some positive integer depending on the cutoff frequency B. Therefore, L(x) can be expressed as a quotient:

$$L(x) = \frac{Z_M}{Y_{N-M+1} + Z_M} \qquad (15)$$

where $Z_M$ is a Chi-squared random variable with M degrees of freedom and $Y_{N-M+1}$ is a Chi-squared random variable with (N−M+1) degrees of freedom independent of $Z_M$. Equation (15) implies that L(x) is a so-called Beta random variable meaning that the cumulative probability distribution function CDF of L(x) is known explicitly. Hence $$P_{FA} = P[L(x) > \gamma \mid H_0] \qquad (16)$$

$$P_{FA} = 1 - \frac{B_\gamma(M, N - M + 1)}{B_1(M, N - M + 1)} \qquad (17)$$

wherein B is the incomplete Beta function defined by:

$$B_\gamma(a,b) = \int_0^\gamma t^{a-1}(1-t)^{b-1}dt, 0 \leq \gamma \leq 1 \qquad (18)$$

Figure 5:
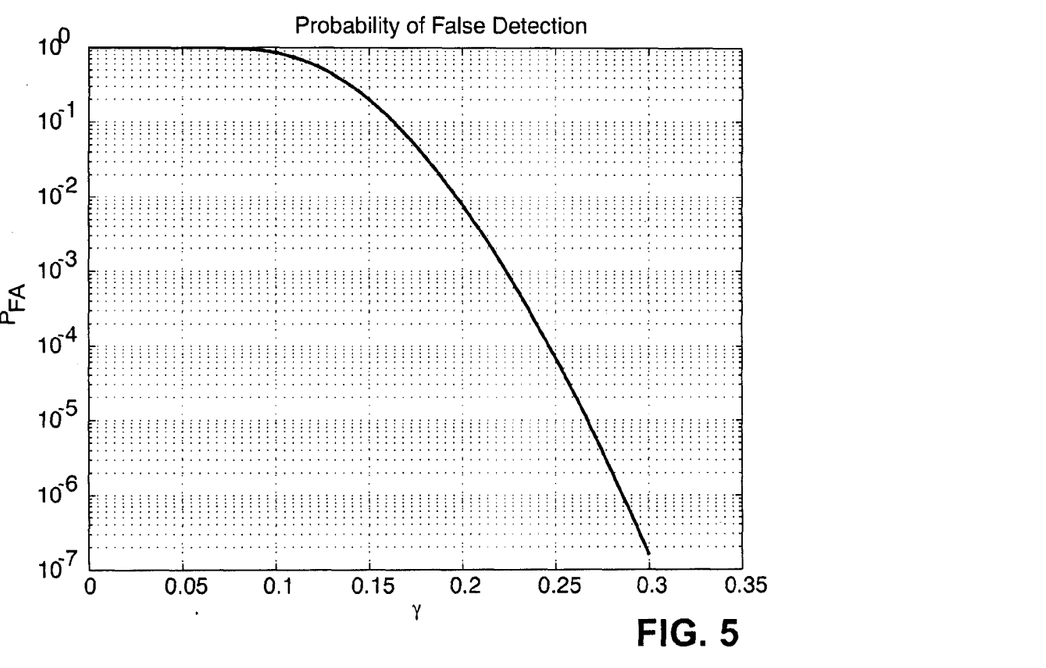
FIG. 5 is a graph illustrating a probability of falsely or wrongly detecting ACI as a function of an ACI threshold.

FIG. 5 illustrates an example probability $P_{FA}$ of falsely detecting ACI as defined in equation (17) plotted against an ACI threshold γ. For example, a ACI threshold γ of 0.27 corresponds to a probability of falsely detecting ACI of one in a one hundred thousand.

Figure 6:
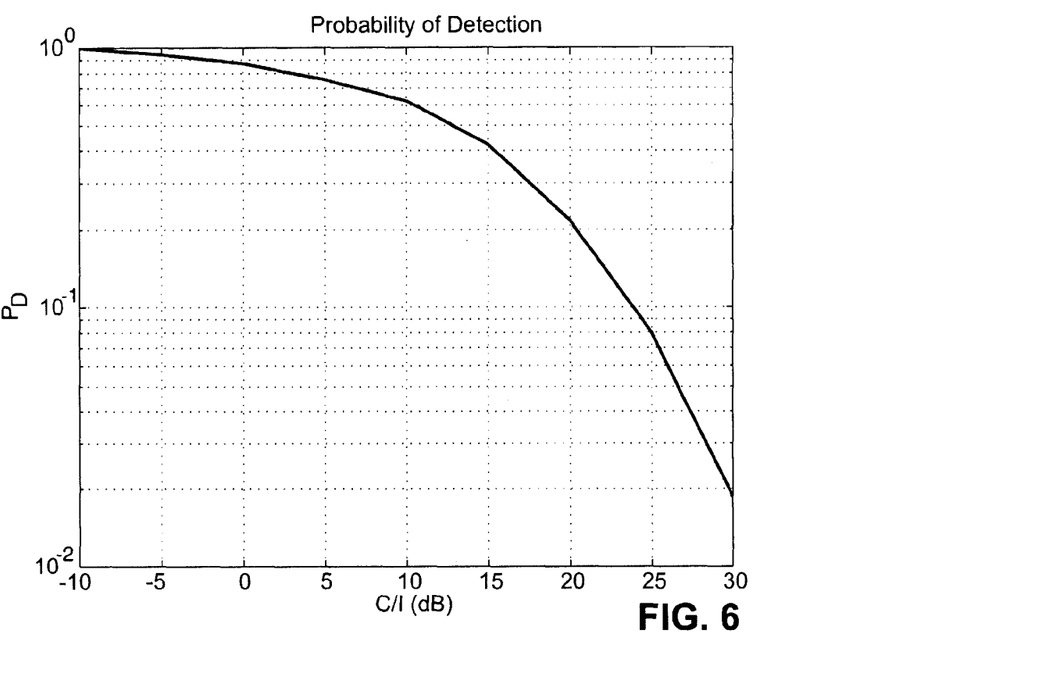
FIG. 6 is a graph illustrating a probability of ACI detection graphed as a function of carrier to interference ratio.

FIG. 6 shows an example of the probability of ACI detection using the above ACI energy detection approach assuming a probability of false alarm has been fixed to about 1/100,000 with a γ of 0.27 for a 2 antenna/branch receiver in a typical urban radio propagation environment using GMSK modulation. As the graph shows, the probability of detecting ACI decreases as C/I improves, and decreases significantly for C/I's greater than 10 dB.

Figure 7:
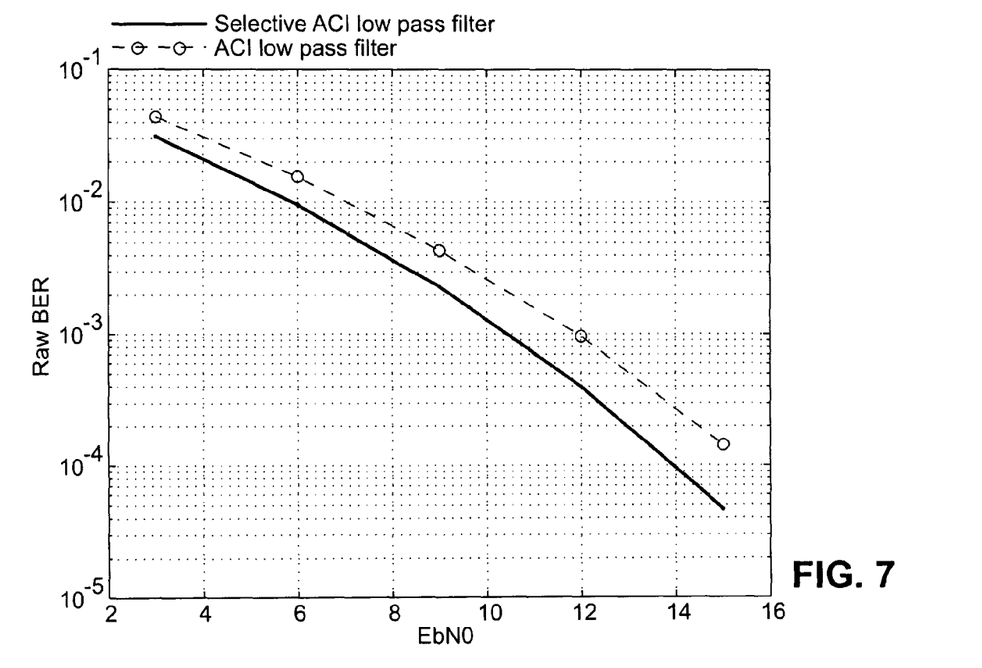
FIG. 7 is a graph illustrating receiver sensitivity when using a fixed ACI lowpass filter and when using a selective ACI lowpass filter.

As described above, using the ACI energy detector permits selective use of ACI filtering. FIG. 7 is a graph illustrating receiver sensitivity when using a fixed ACI lowpass filter and when using a selective ACI lowpass filter in a non-limiting example for a two antenna receiver in a typical urban radio propagation environment, GMSK modulation, and a low pass ACI filter with a 3 dB bandwidth of 160 kHz. The lower curve shows a receiver using a selective ACI low pass filter, and the upper curve shows a receiver with a fixed low pass filter that is always filtering the received signal. The lower graph has a lower bit error rate (BER) indicating better performance.

Figure 8:
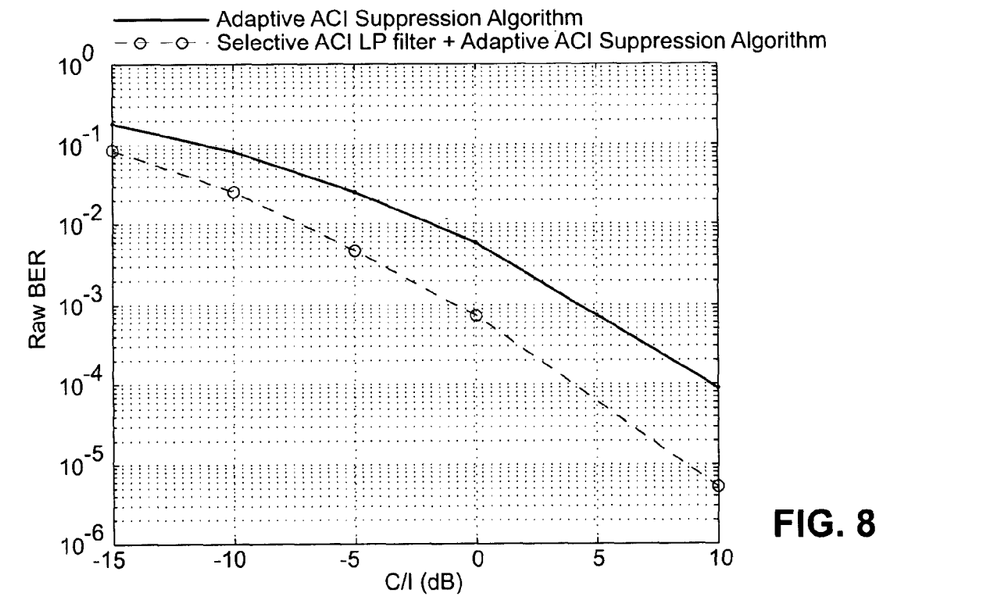
FIG. 8 is a graph illustrating the effectiveness of ACI suppression using selective ACI lowpass filtering coupled with an adaptive ACI suppression algorithm as compared to ACI suppressing using an adaptive ACI suppression algorithm without using selective ACI lowpass filtering.

FIG. 8 is a graph illustrating the effectiveness of ACI suppression using selective ACI lowpass filtering coupled with an adaptive ACI suppression algorithm as compared to ACI suppressing using an adaptive ACI suppression algorithm without using selective ACI lowpass filtering in the example scenario described for FIG. 7. The lower curve shows a receiver using a selective ACI low pass filter coupled with an adaptive ACI suppression algorithm, and the upper curve shows a receiver with a fixed low pass filter that is always filtering the received signal coupled with an adaptive ACI suppression algorithm. Again, the lower graph has a lower bit error rate (BER) indicating better performance.

Figure 9:
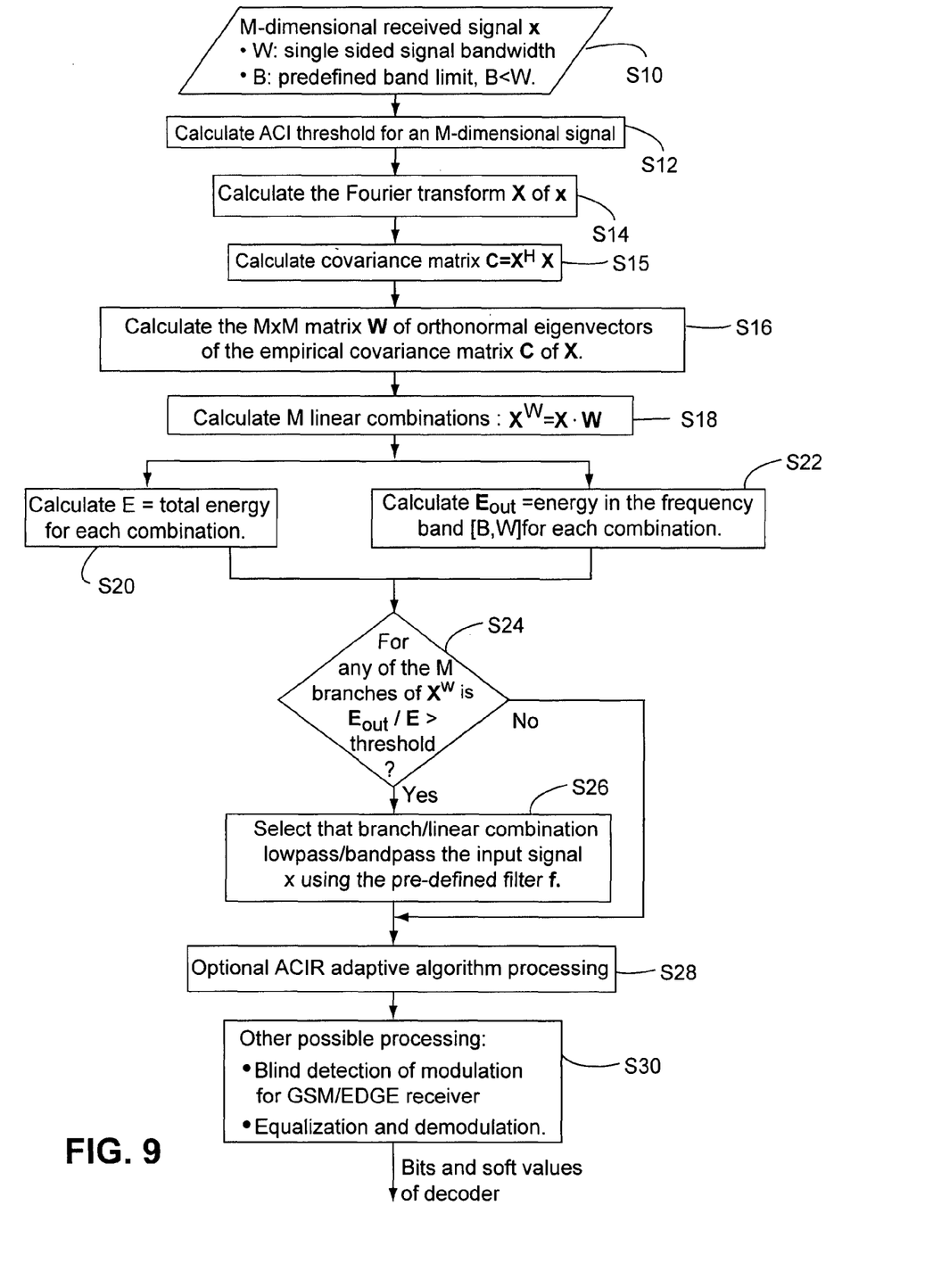
FIG. 9 is a flowchart illustrating another non-limiting example for ACI detection and suppression.

FIG. 9 is a flowchart illustrating another non-limiting example for ACI detection and selective suppression for an M-dimensional received signal, where M is an integer greater than 1. In the first block S10, several variables are defined. An M-dimensional received signal results from an M-antenna branch receiver. For simplicity and without loss of generality, a baseband signal with a center frequency at 0 is assumed. An input signal x has a single-sided bandwidth W on either side of the center frequency. In the non-limiting example case of GSM, x may be one received burst and W=135.4 kHz. A predefined single-sided band limit B is less than W, and most of the desired signal energy lies in the band [−B, B]. One example value for B for the GSM example is B=100 kHz. In addition, a lowpass or bandpass filter f is provided in the receiver. For the GSM example with GMSK modulation, an appropriate example and non-limiting filter may have a 3 dB bandwidth of 160 kHz, linear phase, and a flat passband.

An ACI threshold $\gamma$ is chosen to limit the probability of erroneous ACI detection to any desired level (step S12). Having chosen B in the previous step S10, one non-limiting example way to determine $\gamma$ was described above, but other methods may be used. The ACI threshold $\gamma$ threshold is independent of the radio propagation environment (e.g., urban, rural, hilly terrain, etc.). For example, with the values of W and B of the previous steps, the value threshold=0.27 gives a probability of false detection of about one in one hundred thousand.

Each component of the multi-dimensional input signal x is transformed to the frequency domain via a one-dimensional Fourier transform (step S14) to produce an M-dimensional signal X in the frequency domain. An M×M sample covariance matrix C of X is calculated (step S15). For example, if X is an N×M signal, where N is the number of samples, then the covariance matrix C may be determined as follows: $C=X^*X$, where the superscript $*$ means conjugate the elements of X and transpose X. Then, an M×M weight matrix W whose columns are M normal eigenvectors of C is calculated as X (step S16). The calculation of the matrix W of weights is outlined in equations (12) and (13). The matrix C, defined by equation (12), is Hermitian as implied by the right hand side of equation (12). Its eigenvectors are the solutions of equation (13), where $\lambda$ denotes an eigenvalue. It is well known that Hermitian matrices of dimension M have a unique set of M orthonormal eigenvectors. Every column of the matrix W is one of the orthonormal eigenvectors w. The dimension of matrix W is equal to the dimension of C, and the order in which the eigenvectors appear in matrix W is not important for this description.

The objective in steps S16 and S18 is to reduce the multi-dimensional signal into a one dimensional signal for easier processing. The matrix W allows all the M branches to be linearly combined. The components of X are transformed by forming M linear combinations with the eigenvectors of C. In matrix notation, a new signal (in frequency domain) XW is formed according to the formula $X^W=XW$ (step S18).

Although oversimplified in some respects, it is helpful to understand intuitively that each weighted linear combination of the new signal XW either amplifies the desired signal (for one column of weights in matrix W) or cancels it (for the another column of weights in matrix W), with the linear combination representing the cancellation being selected. If there is adjacent channel interference present, then that ACI will be the only thing left after the desired signal has been cancelled. It is not known a-priori which set of weights will cancel the desired signal and leave only the interference, so all the linear combinations must be constructed and tested, and the one combination where the desired signal is canceled selected. This formulation of each dimension or branch as a linear combination from XW is beam-forming in the frequency domain as explained above.

Returning to FIG. 9, for each one of the linear combinations $X^W$ the total signal energy E (step S20) and the energy $E_{out}$ in the band [B−>W] (step S22) are computed. The ratio $E_{out}/E$ for each linear combination (corresponding to a receiver branch) is calculated, and the linear combination with the highest ratio $E_{out}/E$ is selected because it is the one most like to reflect ACI. That highest ratio $E_{out}/E$ is compared with the ACI threshold (step 24). Adjacent channel interference is detected if its value exceeds the threshold resulting in the signal x being filtered through the ACI filter f (step S26). Otherwise, the ACI filter is bypassed (see the "No" branch leaving step S24).

Additional optional ACI processing may be performed on the filtered signal or on the filter-bypassed signal. For example, an adaptive ACI suppression algorithm may be used (step S28). In block S30, other possible processing likely follows such as equalization and demodulation which produce bits and soft values to a decoder. In a GSM/EDGE receiver, it may also be necessary to perform blind detection of the modulation used in the transmitter that transmitted the signal received in the receiver. For packet data, the receiver does not know in advance the modulation of the burst, which can be either GMSK or 8 PSK. The process of estimating the modulation type is called blind detection of modulation. Without knowing the correct modulation type it is not possible to successfully demodulate a burst. In the presence of ACI, performing step S32 prior to blind detection of modulation may help increase the probability of detection of the correct modulation type.

The adjacent channel interference for the lower frequency side band may be determined in the same fashion but replacing the frequency band [B,W] by the frequency band [−W,−B]. For double sided adjacent interference (i.e. multiple interferers on both the lower and higher adjacent frequency bands), the frequency band is replaced [B,W] with [−W,−B] and [B,W]. In the latter case, a new threshold may be selected if desired.

Figure 10:
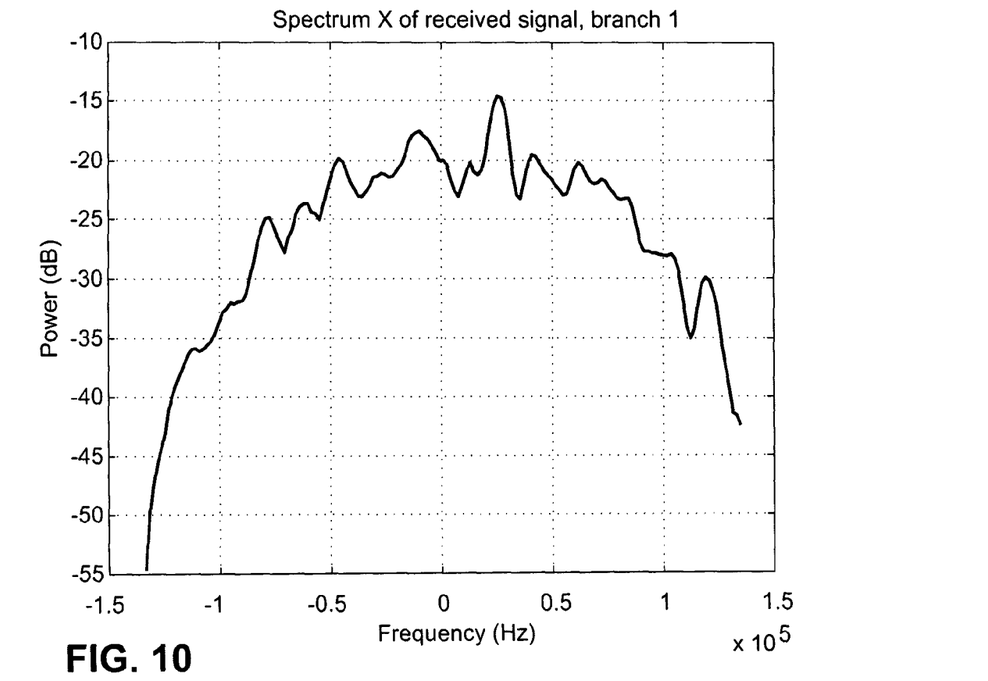
FIGS. 10-13 are graphs associated with a non-limiting example receiver incorporating ACI detection and ACI suppression including two antennas and two receiver branches.
Figure 11:
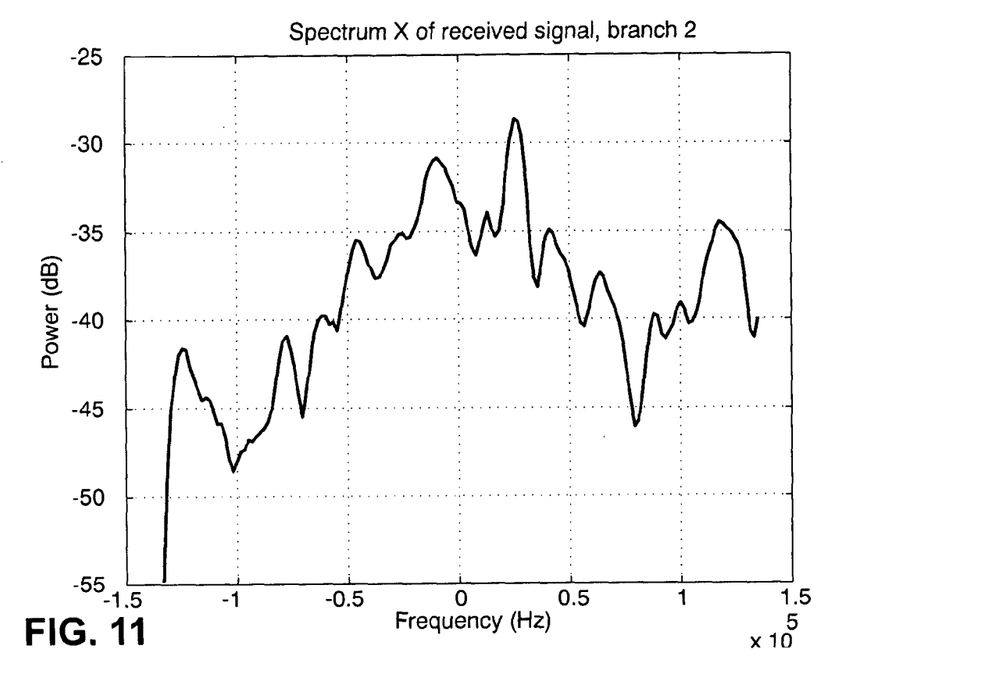

To help illustrate multi-dimensional signal processing, FIGS. 10-13 are graphs associated with a non-limiting example receiver incorporating ACI detection and selective ACI suppression including two antennas and two receiver branches. M=2, W=135 kHz, and B=100 kHz. FIG. 10 illustrates the frequency spectrum X of a received signal on a first receiver branch. The received signal is a typical fading signal in a urban propagation environment. There is one adjacent interferer centered at +200 kHz that is about 18 dB weaker than the desired signal. Branch 1 has a typical "inverted U" spectrum. FIG. 11 illustrates the frequency spectrum of a received signal on the second receiver branch. Branch 2 has a distorted 'inverted U' shape, and it is much weaker than the signal in branch 1 due to the fading.

Following the non-limiting example procedures outlined in FIG. 9, a 2×2 matrix W of weights is built from the eigen vectors of the covariance matrix C of X, i.e., C=X*X. In this example, the matrix W is:

$$W = \begin{bmatrix} 0.15 + 0.01i & 0.99 + 0.06i \\ -0.99 & 0.15 \end{bmatrix}$$

Combining the two branches in the spectrum X using these weights W yields two linear combinations corresponding to the two branches of X, each being a one-dimensional spectrum. They are plotted in FIGS. 12 and 13.

Figure 12:
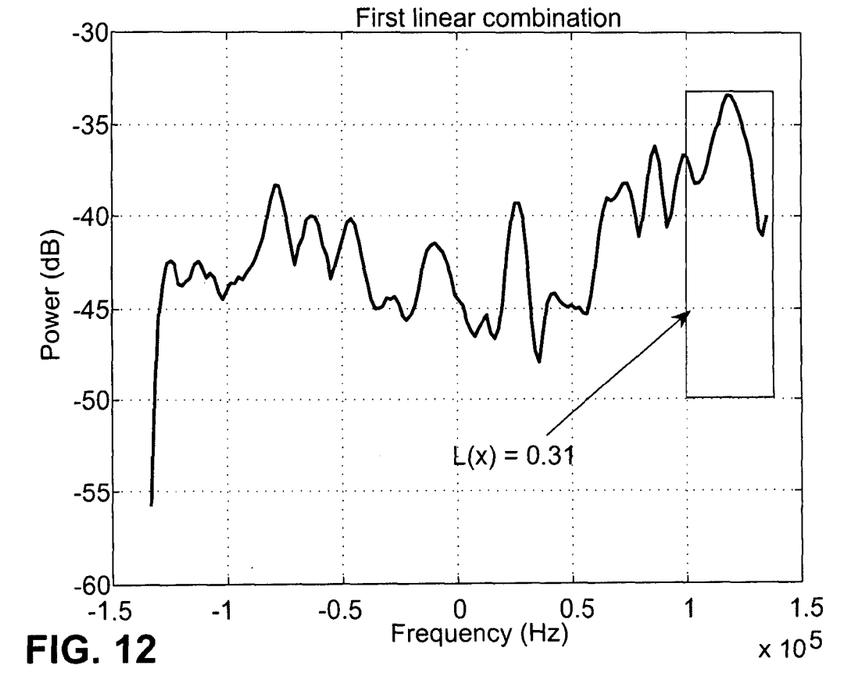
Figure 13:
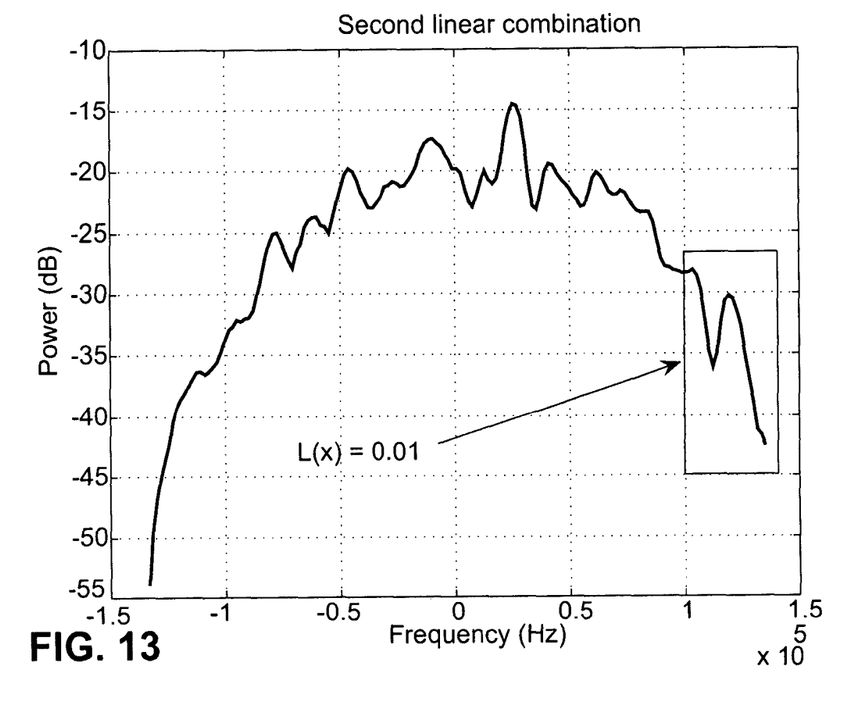

Note that FIG. 10 and FIG. 13 are very similar but not identical. However, FIG. 12 differs considerably from FIG. 11. Even though FIG. 11 has a "bump" in the band from 100 kHz to 135 kHz, most of the signal energy is concentrated near the center of frequency of the signal, approximately between −50 kHz and +50 kHz. On the other hand, in FIG. 12 the bump in the 100 kHz to 135 kHz band contains a significant portion of the signal energy. The question is whether the bump in the 100 to 135 kHz band in FIG. 12 caused by random/statistical fluctuations or is it caused by adjacent channel interference.

The total energy and the energy in the border band from 100 kHz to 135 kHz are then calculated for FIGS. 12 and 13. The ratio of these energies is calculated and compared to an ACI threshold $\gamma$, e.g., 0.27. For FIG. 13, the ratio is 0.01, a typical example value when there is no adjacent interference. For FIG. 12, the ratio is 0.31 which is larger than the example threshold $\gamma$ used above, meaning there is adjacent interference, and ACI filtering is appropriate.

A similar example can be explained when there is no interference present. In this case, the graphs in FIGS. 10 and 11 would look similar, except that FIG. 11 would not have the "bump" in the 100 to 135 kHz band. FIG. 13 would also look very similar, but FIG. 12 would appear rather flat without any large bumps. The energy ratio values might be, for example, on the order of 0.01 and 0.10, respectively.

The ACI selective suppression technology has many advantages. One is increased spectral efficiency which is beneficial because the electromagnetic spectrum is scarce and expensive. Another is a better quality signal. Better protection against adjacent interference also reduces blocking probability during high demand situations. The performance of a receiver is improved. For example, simulations for a GSM receiver indicate additional ACI suppression on the order of 4 to 6 dB for GSMK modulation and 0.5 to 2 dB for 8PSK modulation. Transceivers with better performance and larger margins relative to radio communications standards like GSM and others are attractive to users and operators.

The technology is readily implemented in the digital or analog domains, and in single branch or multiple branch receivers. In the digital domain in particular, the cost of implementation on existing platforms is low requiring only software updates and very few CPU cycles. Moreover, better suppression of ACI improves the blind detection of modulation which is used in some systems like GSM and EDGE.

Receiver performance is improved independently of the mode of operation of the receiver or the nature of the adjacent interference. For example, the performance is improved for a single antenna receiver and for multiple antenna receivers, for synchronized and unsynchronized interference, when there are single or multiple adjacent interferers, or when the interference lies on one side or both sides of the desired signal spectrum.

The technology does not degrade the receiver's sensitivity unlike traditional interference suppression algorithms or devices. The probability of false alarm can be calculated theoretically and independently of the propagation environment for the electromagnetic waves. Nor is the capability to suppress co-channel interference degraded. The technology is robust in the sense that its performance is substantially independent of frequency offsets, the number of interferers, or receiver imperfections/impairments such as phase noise.

The technology offers excellent performance when the signals have been sampled at the symbol rate. Many receiver architectures use digital signals sampled at the symbol rate. This is very significant because adjacent channel interference is out-of-band interference, but once the signal has been downsampled to the symbol rate, there is only information about the in-band energy. The out-of-band energy has been folded or has leaked into the frequency band of the desired signal. But the technology also works for oversampled signals.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A receiver comprising:
  one or more adjacent channel interference (ACI) filters designed to suppress interference in a desired frequency band associated with the receiver;
  an energy detector configured to detect with a predetermined probability of certainty whether adjacent channel interference is present in the desired frequency band using an interference detection threshold that is determined based upon a function indicating a probability of falsely detecting adjacent interference in the desired frequency band; and
  a controller configured to select the received signal for filtering by the one or more ACI filters if the energy detector detects adjacent channel interference is likely present in the desired frequency band and for bypassing ACI filtering of the received signal by the one or more ACI filters if the energy detector detects adjacent channel interference is likely not present in the desired frequency band.

2. The receiver in claim 1, wherein the controller is configured to perform processing on the filtered or the filter-bypassed signal.

3. The receiver in claim 2, wherein the controller is configured to adaptively process the filtered signal to achieve additional adjacent channel interference suppression.

4. The receiver in claim 2, wherein the processing includes one or more of the following: blind detection of a modulation associated with the received signal, equalization of the received signal, or demodulation of the received signal.

5. The receiver in claim 1, wherein the energy detector is configured to determine a first energy of the received signal associated with desired frequency band, a second energy of the received signal associated with a portion of the desired frequency band, and a ratio of the first and second energies.

6. The receiver in claim 5, wherein the energy detector is configured to determine that there is a high probability of certainty of adjacent channel interference in the desired frequency band when the ratio exceeds a threshold.

7. The receiver in claim 6, wherein the threshold is based on a probability detection function and a desired probability of likelihood of certainty.

8. The receiver in claim 6, wherein the received signal x is an M-dimensional signal, where M is an integer greater than or equal to two, and wherein the energy detector is configured to calculate a Fourier transform of the received signal to generate a multi-dimensional signal X in the frequency domain.

9. The receiver in claim 8, wherein the energy detector is configured to calculate:
   an M×M sample covariance matrix C of the Fourier transformed signal X,
   a matrix W whose columns are M normal eigenvectors of the M×M sample covariance matrix C,
   M linear combinations included in $X^W$ determined from X and W,
   the first energy, the second energy, and the ratio for each of the M linear combinations,
   select the ratio having a highest value, and
   compare the selected ratio with the threshold.

10. The receiver in claim 1, wherein the receiver is implemented in a radio base station or in a mobile station.

11. A method for use in a receiver including one or more adjacent channel interference (ACI) filters designed to suppress interference in a desired frequency band associated with the receiver, comprising:
   selecting an acceptable probability of falsely detecting adjacent interference in the desired frequency band;
   determining, by said receiver, an interference detection threshold based upon the selected acceptable probability of falsely detecting adjacent interference in the desired frequency band;
   determining, by said receiver, with a predetermined probability of certainty whether adjacent channel interference is present in the desired frequency band using the determined interference detection threshold;
   filtering, by said receiver, the received signal in the one or more ACI filters if adjacent channel interference is likely present in the desired frequency band; and
   bypassing, by said receiver, ACI filtering of the received signal in the one or more ACI filters if adjacent channel interference is likely not present in the desired frequency band.

12. The method in claim 11, further comprising:
   performing processing on the filtered or the filter-bypassed signal.

13. The method in claim 12, wherein the processing includes adaptive processing the filtered signal to achieve additional adjacent channel interference suppression.

14. The method in claim 12, wherein the processing includes one or more of the following: blind detection of a modulation associated with the received signal, equalization of the received signal, or demodulation of the received signal.

15. The method in claim 11, further comprising:
   determining a first energy of the received signal associated with desired frequency band,
   determining a second energy of the received signal associated with a portion of the desired frequency band, and
   determining a ratio of the first and second energies.

16. The method in claim 15, further comprising:
   determining that there is a high probability of certainty of adjacent channel interference in the desired frequency band when the ratio exceeds a threshold.

17. The method in claim 16, further comprising:
   determining the threshold based on a probability detection function and a desired probability of likelihood of certainty.

18. The method in claim 16, wherein the received signal x is an M-dimensional signal, where M is an integer greater than or equal to two, the method further comprising:
   calculating a Fourier transform of the received signal to generate a multidimensional signal X in the frequency domain.

19. The method in claim 18, further comprising:
   calculating an M×M sample covariance matrix C of the Fourier transformed signal X,
   calculating a matrix W whose columns are M normal eigenvectors of the M×M sample covariance matrix C,
   calculating M linear combinations included in $X^W$ determined from X and W,
   calculating the first energy, the second energy, and the ratio for each of the M linear combinations,
   selecting the ratio having a highest value, and
   comparing the selected ratio with the threshold.

20. The method in claim 11 implemented in a radio base station or in a mobile station.

21. Apparatus for use in a receiver including one or more adjacent channel interference (ACI) filters designed to suppress interference in a desired frequency band associated with the receiver, comprising:
   means for selecting an acceptable probability of falsely detecting adjacent interference in the desired frequency band;
   means for determining an interference detection threshold based upon the selected acceptable probability of falsely detecting adjacent interference in the desired frequency band;
   means for determining with a predetermined probability of certainty whether adjacent channel interference is present in the desired frequency band using the determined interference detection threshold;
   means for filtering the received signal in the one or more ACI filters if adjacent channel interference is likely present in the desired frequency band; and
   means for bypassing ACI filtering of the received signal in the one or more ACI filters if adjacent channel interference is likely not present in the desired frequency band.

22. The apparatus in claim 21, further comprising:
   means for performing processing on the filtered or the filter-bypassed signal including adaptive processing the filtered signal to achieve additional adjacent channel interference suppression.

23. The apparatus in claim 21, further comprising:
   means for determining a first energy of the received signal associated with desired frequency band,
   means for determining a second energy of the received signal associated with a portion of the desired frequency band, and
   means for determining a ratio of the first and second energies.

24. The apparatus in claim 23, further comprising:
means for determining that there is a high probability of certainty of adjacent channel interference in the desired frequency band when the ratio exceeds a threshold.

25. The apparatus in claim 24, further comprising:
means for determining the threshold based on a probability detection function and a desired probability of likelihood of certainty.

26. The receiver in claim 1, wherein the interference detection threshold $\gamma$ is a non-negative real number less than one, given as the unique solution of the following equation with one unknown $\gamma$:

$$P_{FA} = 1 - \frac{B(\gamma, M, N - M + 1)}{B(1, M, N - M + 1)}$$

wherein $P_{FA}$ is the desired predetermined probability of falsely detecting adjacent interference in the desired frequency band, N is a number of received samples per antenna branch of the receiver, M is a predetermined positive integer less than N, and B is an incomplete Beta function defined by:

$$B(\gamma, M, N - M + 1) = \int_0^\gamma t^{M-1}(1-t)^{N-M} dt, \quad \text{for } 0 \leq \gamma \leq 1.$$

27. The method in claim 11, wherein the interference detection threshold $\gamma$ is a non-negative real number less than one, given as the unique solution of the following equation with one unknown $\gamma$:

$$P_{FA} = 1 - \frac{B(\gamma, M, N - M + 1)}{B(1, M, N - M + 1)}$$

wherein $P_{FA}$ is the acceptable probability of falsely detecting adjacent interference in the desired frequency band, N is a number of received samples per antenna branch, M is a predetermined positive integer less than N, and B is an incomplete Beta function defined by:

$$B(\gamma, M, N - M + 1) = \int_0^\gamma t^{M-1}(1-t)^{N-M} dt, \quad \text{for } 0 \leq \gamma \leq 1.$$

\* \* \* \* \*

UNITED STATES PATENT AND TRADEMARK OFFICE
CERTIFICATE OF CORRECTION

| | | |
|---|---|---|
| PATENT NO. | : 7,822,385 B2 | Page 1 of 1 |
| APPLICATION NO. | : 11/710617 | |
| DATED | : October 26, 2010 | |
| INVENTOR(S) | : Lopez | |

It is certified that error appears in the above-identified patent and that said Letters Patent is hereby corrected as shown below:

On the Cover Page, item (54), in Title, in Column 1, Line 2, delete "SUPRESSION" and insert -- SUPPRESSION --, therefor.

In Column 1, Line 2, delete "SUPRESSION" and insert -- SUPPRESSION -- therefor.

In Column 5, Line 32, delete "x={$X_0$,..., $X_N$}" and insert -- x={$x_0$,...,$x_N$} --, therefor.

In Column 11, Line 47, delete "GSMK" and insert -- GMSK --, therefor.

In Column 14, Line 34, in Claim 21, before "Apparatus" insert -- An --.

Signed and Sealed this
Twenty-second Day of March, 2011

David J. Kappos
*Director of the United States Patent and Trademark Office*